United States Patent [19]

Leeper

[11] Patent Number: 4,614,844

[45] Date of Patent: Sep. 30, 1986

[54] TELEPHONE SERVICE CHECKING TERMINAL

[76] Inventor: Budd E. Leeper, RFD #2, Box 100A, Oshkosh, Nebr. 69154

[21] Appl. No.: 633,250

[22] Filed: Jul. 23, 1984

[51] Int. Cl.[4] .................. H04M 9/00; H04M 1/24
[52] U.S. Cl. .................. 179/175.1 R; 179/175.3 R; 361/395; 361/399
[58] Field of Search .............. 179/175.1 R, 175.3 R, 179/175.3 F, 175, 91 R, 91 A, 99 R, 81 R

[56] References Cited

U.S. PATENT DOCUMENTS

| | | |
|---|---|---|
| 4,385,212 | 5/1983 | Tyler .................. 179/179 |
| 4,488,008 | 12/1984 | Dellinger et al. ....... 179/175.1 R X |
| 4,488,011 | 12/1984 | Rogers .................. 179/175.3 R X |
| 4,533,976 | 8/1985 | Suwa .................. 361/395 |

Primary Examiner—Stafford D. Schreyer
Attorney, Agent, or Firm—Harvey B. Jacobson

[57] ABSTRACT

A service checking terminal is interconnected between the service lines of a telephone utility and the subscriber house circuits to protectively enclose a toggle switch and jack that are exposed upon opening of the terminal housing cover. The toggle switch is manually displaceable to a test position in which the house circuits are bypassed by a connection to the jack from the service lines to either determine the location of a fault or establish an external telephone connection.

13 Claims, 9 Drawing Figures

TELEPHONE SERVICE CHECKING TERMINAL

BACKGROUND OF THE INVENTION

This invention relates generally to telephone communication and more particularly to the testing and location of malfunctions in telephone communication equipment.

In view of the relatively recent change in telephone utility monopoly policy and the associated organizational divisions and separation of responsibilities for service and maintenance of equipment, telephone subscribers have had various problems involving the location of communication failures and malfunctions in order to determine responsibility for repairs. Generally, the subscriber is responsible for all equipment within his own house, while the utility company is responsible for equipment externally of the house. Accordingly, if the utility traces any problem to faulty equipment within the subscriber's house, the subscriber is charged for service in locating or tracing such fault. Alternatively, the subscriber could arrange for locating and testing services independently of the utility. However, testing equipment presently available is costly and complex, and often requires a degree of skill, not usually possessed by the subscriber, requiring the services of trained personnel.

It is, therefore, an important object of the present invention to provide an economical method and means for determining the location of fault in a telephone communication system, adapted for use for each subscriber without any special skill.

SUMMARY OF THE INVENTION

In accordance with the present invention, the usual telephone utility service lines are coupled to the internal telephone circuitry of a subscriber's house through a special terminal located adjacent to but outside of the house. The terminal is enclosed by a protective housing having a cover lid that may be opened to expose one or more toggle switches and modular telephone jacks associated therewith. Each toggle switch is manually displaceable from a normal position in which the jacks are disconnected from the service lines. In the other operative test position of the toggle switch, the service lines are disconnected from the subscriber house circuit and are connected to the telephone jack in the terminal so as to establish a telephone connection in bypass relation to the house circuits by plugging into the jack a telephone instrument known to be in good working condition. Thus the toggle switch actuation is independent of any plug in of the telephone jack, the subscriber is in a position to determine by deduction whether the fault is in the house circuitry or in the service lines. Further, a telephone connection may be optionally established external to the house through the service checking terminal as a convenience.

The toggle switches and modular jacks of the terminal are mounted oon a circuit board seated on a shoulder formation of the terminal housing to permanently enclose a compartment within which the switch wiring is disposed. The circuit board also mounts terminal posts to which the service lines and the house circuit lines are connected. The service line terminal posts are separately enclosed within a utility security enclosure fixed to the circuit board.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF PREFERRED EMBODIMENT

Figure 1:
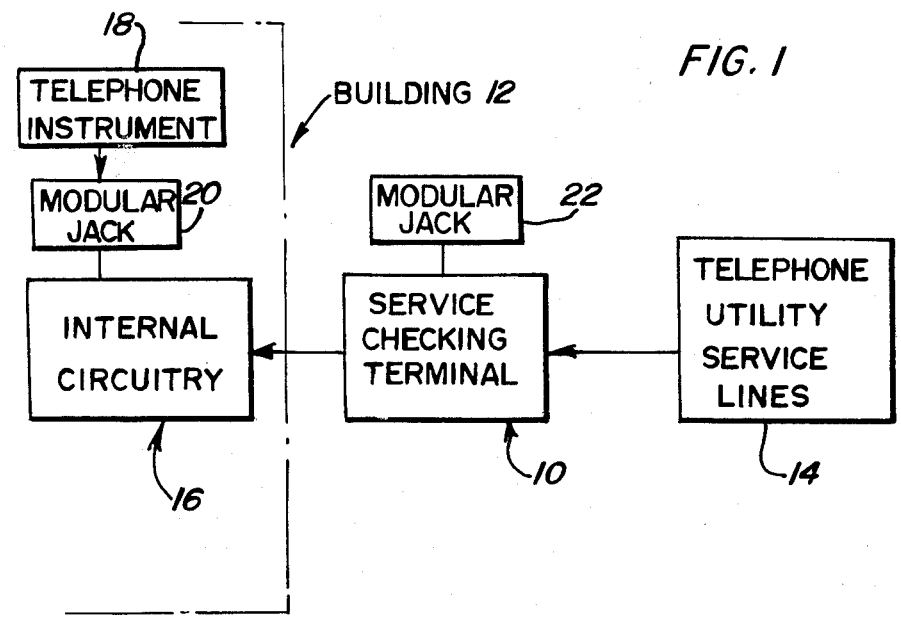
FIG. 1 is a schematic block diagram illustrating the installation of the present invention.

Referring now to the drawings in detail, FIG. 1 schematically illustrates a typical installation for the present invention which involves a telephone service checking terminal generally referred to by reference numeral 10. The terminal 10 is located adjacent to but externally of a building 12, such as a residential house, provided with telephone service from a telephone utility through service lines 14 ordinarily permanently coupled to internal telephone circuitry 16 within the building to which telephone instruments 18 are connected through modular jacks 20. By means of the terminal 10, the service lines 14 may be disconnected from the internal circuitry 16 and at the same time coupled to a modular type of telephone jack 22 associated with the terminal to thereby establish a service line connection externally of the building in bypass relation to the internal circuitry 16. A telephone instrument determined to be in proper working condition may then be plugged into the jack 22 in order to test the operability of the service line equipment externally of the building 12. If the external service lines are so determined to be operable, it may then be deduced that any communication failure or malfunction results from defects in the circuitry 16 or equipment inside the building. In addition to the malfunction locating purpose of the terminal 10, it also provides the convenience of a telephone hook up capability outside of the building. In accordance with the present invention, the terminal 10 provides such malfunction testing and optional telephone connection conveniences with utmost environmental protection and utility security in a most economical manner.

Figure 2:
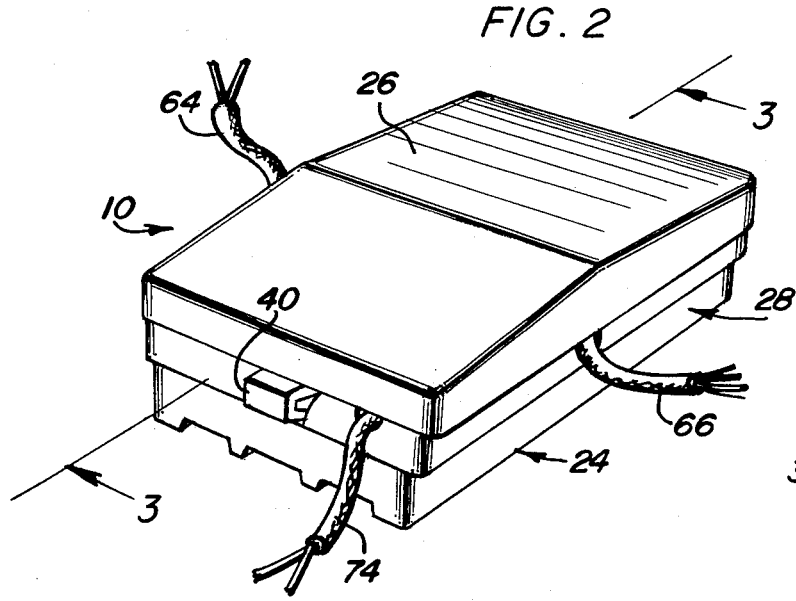
FIG. 2 is a perspective view of a service checking terminal in accordance with one embodiment of the invention.
Figure 3A:
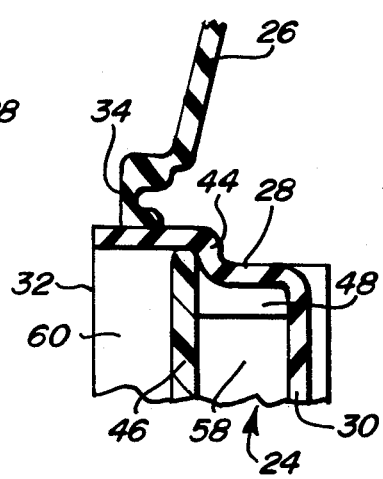
FIG. 3A is a partial side sectional view showing the terminal of FIG. 3 opened.
Figure 7:
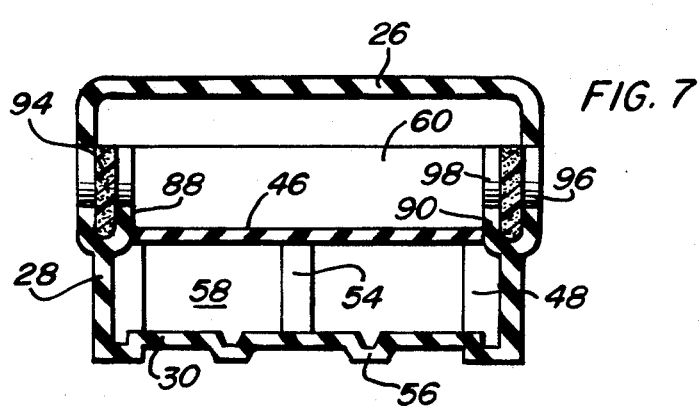
FIG. 7 is a transverse sectional view taken through a plane indicated by section line 7—7 in FIG. 4.
Figure 3:
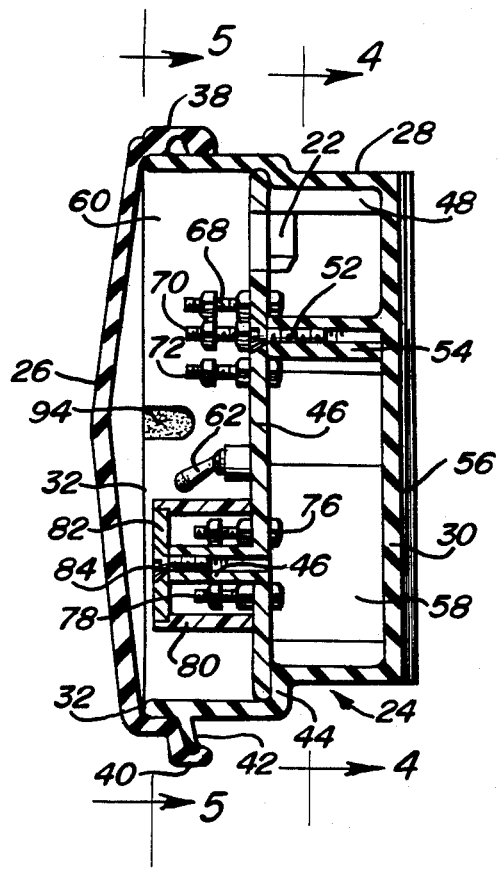
FIG. 3 is a side sectional view taken through a plane indicated by section line 3—3 in FIG. 2.
Figure 4:
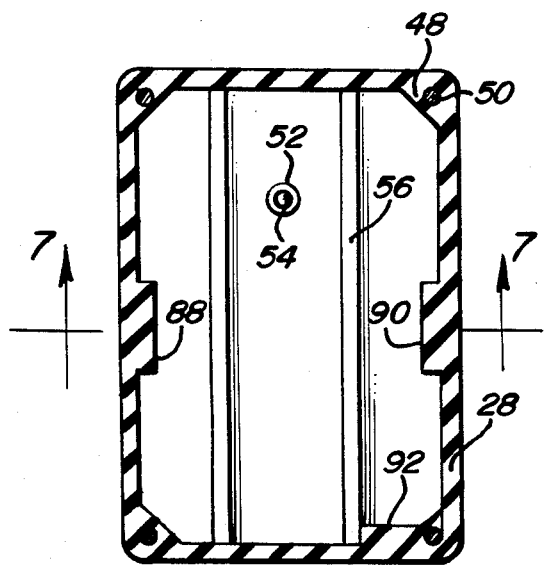
FIGS. 4 and 5 are sectional views taken through planes indicated by section lines 4—4 and 5—5 in FIG. 3.

In accordance with one embodiment of the invention, the terminal 10 as depicted in FIG. 2 has an outer protective housing generally referred to by reference numeral 24 with which a cover lid 26 is associated. The housing and lid are made of a suitable, non-porous, enduring material such as a plastic. As shown, the housing is generally rectangular in shape and has a peripheral wall formed integral with a base wall 30 that is generally aligned with a plane parallel to the plane of the wall rim 32 on which the cover lid is seated in a closed sealing position as shown in FIGS. 2, 3 and 7. The cover lid is provided at one end with a flexible hinge portion 34 secured as by cementing to the peripheral wall 28 of the housing. A latch formation 40 projects from the other end of the cover lid for engagement with a catch formation 42 on the wall 28 of the housing a more clearly seen in FIG. 3 in order to lock the cover lid in its closed sealing position. The cover lid is simply pulled open by means of the latch 40 and retracted as shown in FIG. 3A in order to expose the interior of the housing at the rim 32.

As more clearly seen in FIG. 3, the peripheral wall 28 of the housing is provided with a shoulder formation 44 forming a ledge on which a terminal circuit board 46 is seated. At the corners of the housing, the board 46 overlies corner formations 48 through which fasteners 50 extend from the board to hold it seated on the shoulder formation 44. The board is further fixed in place within the housing by a fastener 52 extending therefrom through a support column 54 projecting from the base wall 30 into abutment with the board as more clearly seen in FIG. 3. The base wall is provided with rigidifying rib formations 56 as more clearly seen in FIG. 7.

Figure 5:
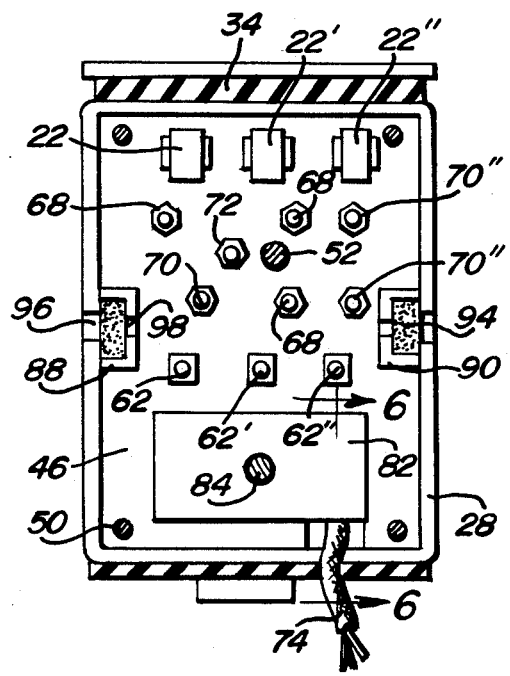

The terminal circuit board 46 divides the housing into a first compartment 58 closed by base wall 30 and a second compartment open at rim 32 but closed by the cover lid 26 in its closed sealing position. Compartment 58 encloses wiring respectively interconnecting three manually operable toggle switches 62, 62' and 62" mounted on board 46 with their actuators exposed in compartment 60 as shown in FIGS. 3 and 5, to corresponding terminal posts and modular types of telephone jacks 22, 22' and 22". The terminal posts are also fixedly mounted on the board 46 and include one group to which internal house circuit lines are electrically connected, such house lines being led to the terminal 10 from the building through conductor cables 64 and 66. In the illustrated embodiment, three separate internal telephone circuits are accommodated, the circuits being respectively electrically connected by house lines to pairs of terminal posts 68 and 70, 68' and 70' or 68" and 70'. A house ground terminal post 72 is also provided. A second group of terminal posts are electrically connected to the service lines through conductor cables 74. The second group also includes three pair of terminal posts 76 and 78 separately enclosed within a service security enclosure 80 fixed to the board 46 and having a removable lid 82. The lid 82 is secured to enclosure 80 by a fastener 84 threadedly received in a support column 86 projecting from the board into abutment with lid 82.

Figure 6:
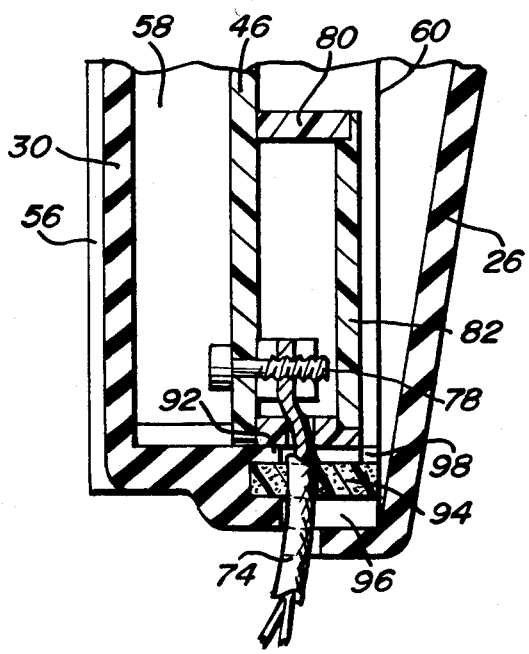
FIG. 6 is an enlarged partial sectional view taken through a plane indicated by section line 6—6 in FIG. 5.

The conductor cables 64, 66 and 74 extend into the terminal housing 24 through three cable sealing pocket formations 88, 90 and 92 projecting inwardly from the peripheral wall 28 of the housing to enclose foam-type pads 94 as more clearly seen in FIGS. 5, 6, and 7. The aligned slots 96 and 98 are respectively formed in the peripheral wall 28 and each of the formations 88, 90 and 92 to receive the conductor cables 64, 66 and 74.

Figure 8:
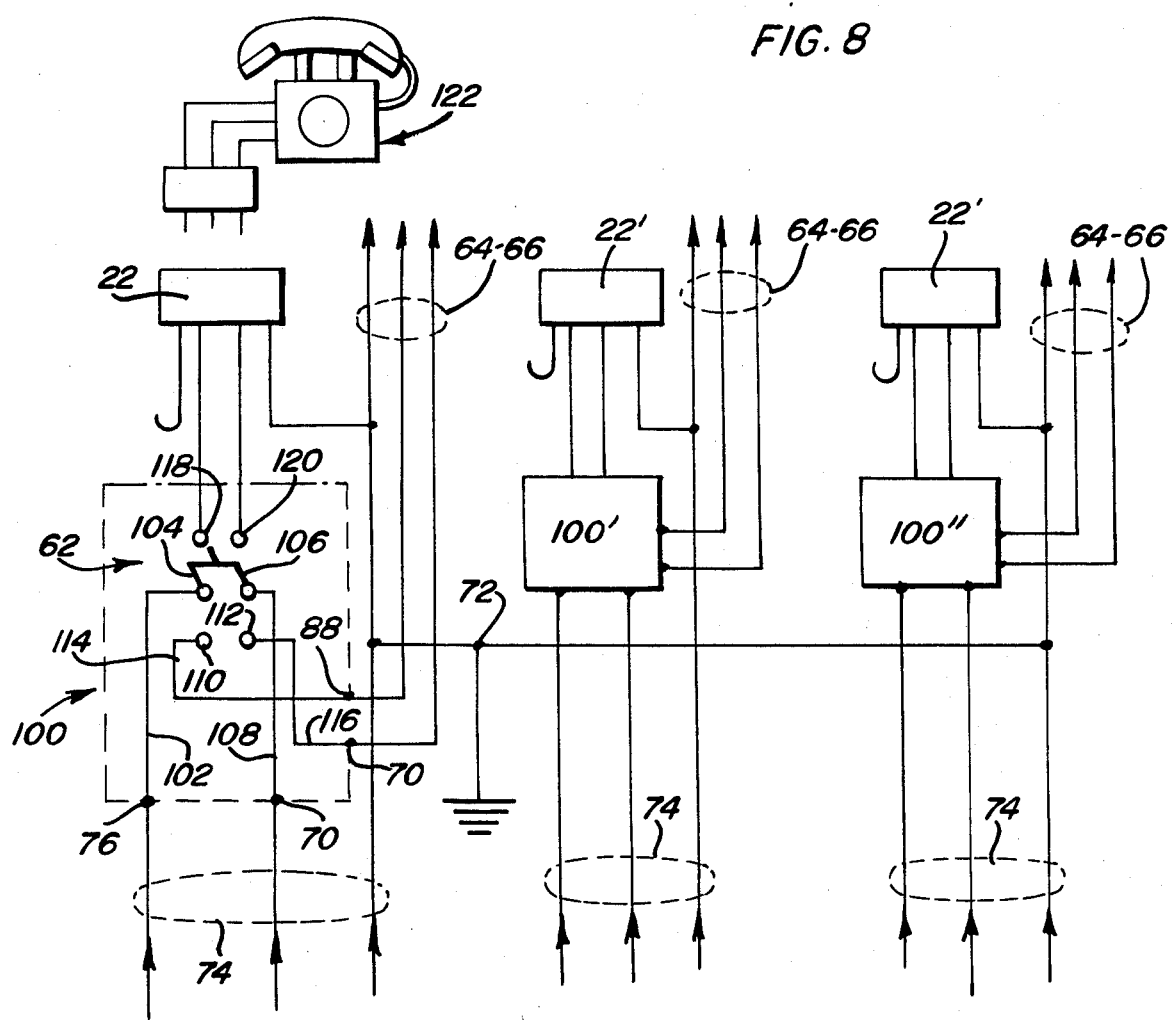
FIG. 8 is an electrical circuit diagram corresponding to the circuitry associated with the terminal of FIGS. 1-7.

FIG. 8 illustrates the wiring 100 associated with toggle switch 62 to be disposed within closed compartment 58 of the terminal housing 24. The wiring 100 includes a conductor 102 electrically connecting the tip terminal post 76 for the service lines in cable 74 to one contactor 104 of the toggle switch 62 while the other contactor 106 is connected by conductor 108 to the ring terminal post 78. One pair of contacts 110 and 112 of the toggle switch are electrically connected by conductors 114 and 116 to the corresponding tip and ring terminal posts 68 and 70 to which the house circuit lines in cables 64–66 are connected. A second pair of contacts 118 and 120 electrically connect the toggle switch to its associated modular telephone jack 22. Toggle switch wiring 100' and 100" similarly interconnect the other toggle switches 62' and 62" to the other service and house circuit lines for alternately coupling each service line with a corresponding internal house circuit and an external modular jack in the terminal. Thus, in the normal operative position of the toggle switch with the contactors engaging contacts 110 and 112, the service and house circuit lines are coupled. In the other operative test position of the toggle switch with the contacts 118 and 120 engaged, the service line is disconnected from the internal housing circuitry and is instead connected to the modular jack 22, for example. A telephone instrument 122 known to be in perfect working condition may then be plugged into jack 22 to either locate communication malfunction or to establish a telephone connection externally of the house. Where a plurality of internal telephone circuits are being serviced, such as the three shown, all three have a common ground connected to terminal post 72.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a building having a subscriber telephone circuit to which at least one telephone instrument is coupled, and telephone utility service lines connected to said subscriber circuit, a service checking terminal assembly comprising a protective enclosure disposed externally of the building, at least one telephone jack mounted within the protective enclosure normally disconnected from the service lines, terminal means mounted within the enclosure to which the subscriber circuit and the utility service lines are permanently connected, and manually operable switch means mounted within the enclosure and connected to the terminal means for selectively coupling the utility service lines alternatively to the telephone jack and the subscriber circuit.

2. The combination of claim 1 wherein the protective enclosure comprises a housing within which the terminal means is seated, conductor sealing means mounted by the housing through which the subscriber circuit and the utility service lines extend from the terminal means, and cover means connected to the housing for enclosing the jack and the switch means therein.

3. The combination of claim 2 wherein the terminal means includes a circuit board on which the jack and the switch means are mounted, a plurality of terminal posts fixed to the circuit board to which the subscriber circuit and the utility service lines are electrically connected and security sealing means for separately enclosing the terminal posts to which the utility service lines are connected.

4. The combination of claim 3 wherein said housing has a peripheral wall provided with a shoulder formation on which the circuit board is seated to divide the housing ino a first compartment and a second compartment exposed upon opening of the cover means, the jack and the switch means being exposed in said second compartment, and a base wall connected to the peripheral wall closing the first compartment.

5. The combination of claim 4 including a spacing support column extending from the base wall of the housing into abutment with the circuit board and means fastening the circuit board to the spacing support column for holding the circuit board seated on the shoulder formation.

6. The combination of claim 5 wherein said conductor sealing means comprises a plurality of spaced pocket formations projecting from the peripheral wall of the housing into the first compartment, aligned slots being formed in the pocket formation and the peripheral wall through which conductors from the subscriber circuit wiring and the utility service lines extend, and a sealing pad material enclosed by the pocket formations about said conductors.

7. The combination of claim 6 wherein said switch means comprises a two-position, double contact toggle switch and circuit wiring extending from the switch through the second compartment to the terminal posts.

8. The combination of claim 4 wherein said conductor sealing means comprises a plurality of spaced pocket formations projecting from the peripheral wall of the housing into the first compartment, aligned slots being formed in the pocket formation and the peripheral wall through which conductors from the internal circuit and the utility service lines extend, and a sealing pad material enclosed by the pocket formations about said conductors.

9. The combination of claim 4 wherein said switch means comprises a two-position, double contact toggle switch and circuit wiring extending from the switch through the second compartment to the terminal posts.

10. In combination with a building having internal telephone circuit lines to which at least one telephone instrument is coupled, and telephone utility service lines connected to said internal circuit lines, a service checking terminal assembly comprising a protective enclosure disposed externally of the building, at least one telephone jack mounted within the protective enclosure normally disconnected from the service lines, terminal means mounted within the enclosure to which the jack and the utility service lines are permanently connected, a manually operable switch selectively displaceable between operative positions connecting the utility service lines to the jack and the internal circuit lines, respectively, and means for opening the protective enclosure to expose the jack and the switch externally of the building, whereby the telephone instrument may be plugged into the jack for connection to the utility service lines in bypass relation to the internal circuit lines when the switch is in one of the operative positions thereof disconnecting the internal circuit lines from the utility service lines.

11. In a service terminal assembly having a terminal circuit board, the improvement comprising at least one adaptor jack mounted on the board, at least two groups of conductor terminals mounted on the board, and manually operable switch means mounted on the board and connected to one of said groups of terminals for selectively connecting said one of said groups of conductor terminals alternatively to the jack and the other of the groups of terminals.

12. The combination of claim 11 including security sealing means for separately enclosing one of the groups of terminals on the circuit board within a first compartment of a housing.

13. The combination of claim 12 including a spacing support column extending from a base wall of the housing into abutment with the circuit board and means fastening the circuit board to the spacing support column for holding the circuit board seated on a shoulder formation of the housing.

* * * * *